Dec. 29, 1942.  W. E. KNAPP  2,306,814
TRACTOR PLOW
Filed Feb. 15, 1940  3 Sheets-Sheet 1

Inventor
William E. Knapp
By Carlsen & Hagle
Attorneys

Dec. 29, 1942.  W. E. KNAPP  2,306,814
TRACTOR PLOW
Filed Feb. 15, 1940    3 Sheets-Sheet 2

Inventor
William E. Knapp
By Carlsen + Hazle
Attorneys

Dec. 29, 1942.  W. E. KNAPP  2,306,814
TRACTOR PLOW
Filed Feb. 15, 1940  3 Sheets-Sheet 3

Inventor
William E. Knapp
By Carlsen & Hagle
Attorneys

Patented Dec. 29, 1942

2,306,814

UNITED STATES PATENT OFFICE 2,306,814

TRACTOR PLOW

William E. Knapp, Moline, Ill., assignor to Minneapolis-Moline Power Implement Company, Minneapolis, Minn., a corporation of Delaware Application February 15, 1940, Serial No. 319,087

13 Claims. (Cl. 97—50)

This invention relates generally to agricultural implements and more particularly to improvements in what are generally known in the art as two-way plows.

Such implements comprise, in combination with a wheeled, power driven frame, such as a tractor, a pair of plow units and connections by which either unit may be raised while the other is in a lowered working position. The plow units are arranged substantially side by side, and are right and left handed to throw the furrow slice in opposite directions. Only one unit is used at a time and in operation the plow is driven back and forth across the field and at each crossing the furrow slice is taken off the same end of the land. The advantages of such plows, such as the elimination of dead furrows, back ridges, and the like, are too well known to require detailed consideration herein.

In the construction and operation of such implements there are numerous problems which so far as I am aware have not hitherto been adequately overcome. It is obviously necessary that the idle plow unit be raised sufficiently high to prevent the collection thereon of trash from the field, and the necessary lift is made difficult of realization due to the fact that one traction wheel of the tractor is caused to run in the previously made furrow resulting in a transverse tilting and lowering of the entire implement.

My invention has therefore, as one of its primary objects, the provision of novel and effective mountings and connections by which high lift of the idle plow unit may be obtained and so that the unit will ride high enough from the ground to clear all trash thereon. To this end, and in accordance with my invention, the movement of the plow units from working to idle position is on a bias so that the unit moves both upwardly and outwardly to thereby hang well to the rear of the highest tractor wheel, and thus secure the maximum clearance from the ground.

My invention has as another important object the improvement in the support and draft transmission structure of such plows so that the side draft is to the greatest extent placed upon the plow units and removed from the tractor, making it much easier to steer the tractor. This has been a shortcoming in certain previous plows due to the transmission of draft forces to the tractor along outwardly spaced lines from the normal pulling point, and a resulting difficulty in proper steering.

Still another object of my invention is to provide improved means for adjusting the depth of the furrows cut by the plow units and correspondingly adjusting the tilt angle of the plow units relative to the horizontal plane. The tilt adjustment is required since the degree of inclination of the plow units varies according to their working depth as is well known, and such adjustment should be capable of being made at any time independently of other adjustments.

A further object is to provide a novel and extremely efficient power lifting mechanism by which the plow units may be raised or lowered independently or simultaneously and retained in position without the use of mechanical latches or similar mechanisms.

These and other more detailed and specific objects will be disclosed in the course of the following specification, reference being had to the accompanying drawings, in which—

Figure 1:
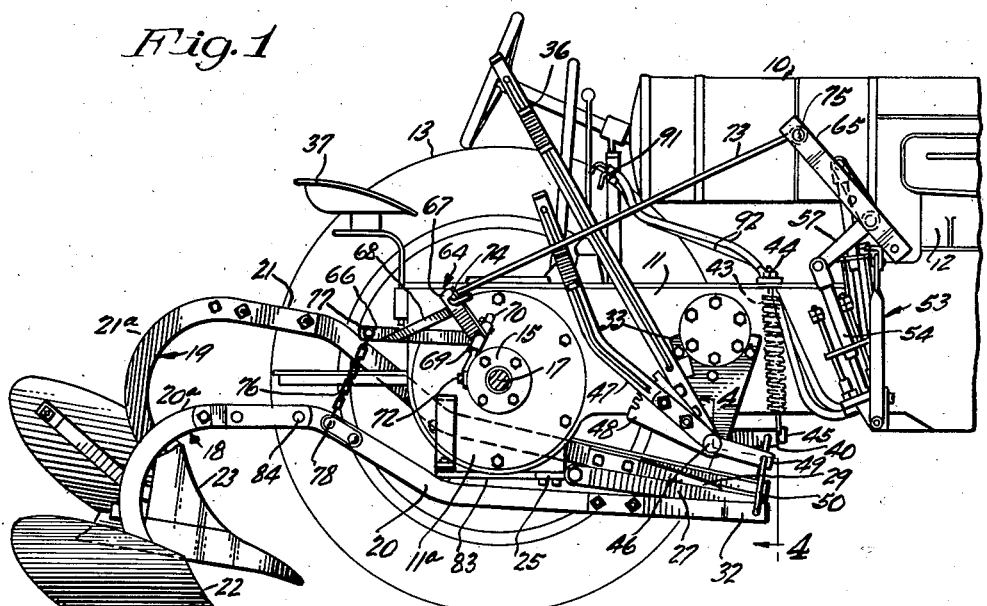
Fig. 1 is a side elevation of the rear portion of a tractor and two-way plow constituting my invention, with the near traction wheel of the tractor removed to better disclose the plow construction.

It may be noted at this point that the two-way plow herein shown and described is for purposes of exemplifying the application of my invention thereto, and the principles of my invention are applicable as well to other implements in which removably mounted soil engaging or working units are to be moved into and out of working positions.

The two-way plow shown in the drawings is of the type adapted for connection and support to and on a power driven wheeled frame such as a tractor, and the entire plow mechanism forms an attachment which may be easily assembled on, or removed from, the tractor. In the drawings the tractor, of substantially usual form, is indicated generally at 10 and comprises a longitudinally extending housing or frame portion 11 supporting the power unit 12 and other working parts, and in turn supported by large rear traction wheels 13 and dirigible front wheels 14, the latter shown only diagrammatically in Fig. 3. Right and left axle housings 15 and 16 extend from the rear of the housing 11 to enclose the rear wheel axles 17 upon which the wheels 13 are mounted, the said axles extending from the housings 15 and 16 for some distance to provide for adjustment of the tread spacing of the wheels in well known manner. Other parts of the tractor, per se, with which certain mechanism of my invention are connected, will be referred to in the course of the following description.

My improved implement structure includes, in the form exemplified, a pair of tool members, gangs, or plow units referred to generally by reference numerals 18 and 19, and which are both the same in general construction except that the plow bottoms are shaped and disposed to turn furrows in opposite directions. The units comprise the beams 20 and 21 and plow bottoms 22 and 23 and are referred to hereinafter as right and left hand, respectively, this being determined by looking forwardly at the implement.

The beams 20 and 21 are, as shown, made with short rear sections 20a and 21a which are pivoted in overlapping relationship to the rear ends of the longer forward portions of the beams by bolts 84. Friction straps 85 are secured at forward ends by the bolts 84 and at rear ends by bolts 86 to engage the rear ends of the beams and bolts 87 passed through the beams and these straps fit upwardly opening notches 88 in said rear ends. Normally the parts are maintained in the position shown and are retained by friction set by tightening the bolts 87 but, should either plow bottom strike an obstruction in the field, the extra force will be sufficient to swing the rear beam sections 20a or 21a upwardly to allow the plow to clear such obstruction. The alignment may then be restored by swinging the plow back to position and tightening the bolt 87.

At the rear, lower portion of the tractor housing 11 is secured a hitch plate 25, having a transversely axised pivot pin 26 upon the ends of which are pivoted the rear ends of a pair of hitch bars 27 forwardly converging and supporting a transverse hitch pin 28. The forward ends of the beams 20 and 21 are provided with hitch brackets and braces 29 rigidly secured to their inner sides and arranged to provide arm portions 30 spaced inwardly from the beams and apertured to loosely engage the ends of the hitch pin 28 upon which they are retained by keys 31. Similarly shaped tilting brackets 32 are secured to the outer sides of each beam for a purpose hereinafter appearing.

Hanger bearings or plates 33 are secured to the sides of the tractor housing 11 and are provided with transversely aligned and axised bearing 34, above and rearwardly of the forward ends of the plow beams in the arrangement here shown, to receive a transverse tubular rock shaft 35 forming a part of the depth control mechanism. A depth control lever 36 is rigidly secured to (preferably) the right hand end portion of the shaft 35 and extends therefrom upwardly and rearwardly for convenient manipulation by the tractor operator seated in the tractor seat 37, this lever having the usual hand releasable latch mechanism engaging a toothed segment 39 rigidly secured to the adjacent hanger plate 33. A lift arm 40 is rigidly secured to and radially extended from a center portion of the rock shaft 35 and at its end is disposed over the forward ends of the hitch bars 27 for connection thereto by link straps 41 which are pivotally connected at 42 to the arm and pivotally engaging the hitch pin 28 at their lower ends. The forward and rearward movement of the depth control lever 36 will thus be seen to turn the shaft 35 about its axis, oscillating the arm 40 in the vertical plane and lowering and raising the hitch pin 28 which serves as the hitch or draft connection for both plow units. Such movement of the hitch point will, as well understood in the art, control and determine the depth at which the plows run in the soil. A retractile coil spring 43 stretched between a connection 44 with the tractor housing 11 and an arm 45 forwardly and radially secured on the rock shaft 35 normally tends to elevate the hitch point, thus aiding in the operation of the depth adjusting mechanism in an apparent manner.

A leveling shaft 46 is journaled through the tubular depth control shaft 35 and projects at its ends therefrom. This shaft 46 carries a leveling lever 47 which is preferably shorter than the depth control lever 36 and likewise extends upwardly and rearwardly for manipulation by the driver to turn the shaft. However, the latch mechanism for lever 47 engages a toothed segment 48 rigidly secured to the adjacent end of the shaft 35 and as a result, when the lever 47 is locked to this segment, the manipulation of the depth control lever 36 will turn both shafts 35 and 46. On the other hand the shaft 46 may be independently adjusted by unlatching and operating the leveling lever 47. Arms 49 are secured to outer ends of the shaft 46 and at their ends stand above the outer forward extremities of the outer brackets 32 which are secured to the plow beams 20 and 21, as aforesaid. Link rods 50 are pivotally connected at their upper ends 51 to the arms 49 and at their lower ends 52 pivotally engage the said bracket 32. The manipulation of the leveling lever 47 will thus be seen to result in the raising and lowering of the link rods 50 to thereby tilt the beams 20 and 21 about their longitudinal axes and transversely level the plow bottoms 22 and 23 as may be required. However, the degree of this tilt of the beams may be maintained, after once adjusted, by manipulating only the depth control lever 26. Thus it will be seen that by my invention the plow bottoms may be adjusted to run at the desired depth and leveled as may be required, the adjusted level being maintained during subsequent depth adjustment, or further varied as circumstances may dictate.

The connection between the beams 20 and 21 and the hitch pin 28 is of course sufficiently loose to permit the angular movement of the beams as well as the up and down movement thereof as required.

The plow units must be raised and lowered bodily as the work is shifted from one to the other in successive trips across the field, and for this purpose I provide power lift means now to be described.

The actual power lifting mechanism is represented generally by numeral 53 and is identical in essential respects to the hydraulic lift mechanism disclosed in the patent of William E. Knapp and Paul C. Seaholm, No. 2,264,595, December 2, 1941, to which attention is invited for a complete and detailed description. This mechanism includes, in combination with a pump unit (not shown herein but preferably actuated by the tractor engine 12) a pair of lift units or jacks 54 and 55 which are pivotally supported at lower ends upon hanger arms 56 secured to the tractor side and at their upper forked ends are pivotally connected to rock shaft arms 57 and 58. A rock shaft assembly is journaled transversely across the tractor in bearings 59 and includes a solid shaft 60 and telescoped tubular shaft or sleeve 61 on one end thereof. The arms 57 and 58 are secured rigidly to the shaft 60 and sleeve 61, respectively, and lifting levers 62 and 63 are secured to the end of the sleeve 61 on the right hand side of the tractor and to the end of shaft 60 on the left hand side. A control valve mechanism 91 is provided by which fluid under pressure may be admitted, as through lines 92, to either of the jacks 54 and 55, or to both at one time, the admission of the fluid causing the jacks to swing the rock shaft arms 57 and 58 upwardly and oscillate the rock shaft 60 and sleeve 61 on their axes. Either of the lifting arms 62 and 63 may thus be oscillated or swung forwardly and rearwardly in vertical planes at each side of the tractor, as will be evident, and they may of course be held at any relative adjusted position by proper manipulation of the valve.

Mounted at the rear portion of the tractor, as here shown upon the axle housings 15 and 16, are right and left hand rocker arms or bell-crank levers 64 and 65 including the rearwardly directed lifting members 66 and rearwardly, upwardly and angularly disposed pulling members 67. Braces 68 connect the members 66—67 of each rocker arm and at the junctions of the members are provided tubular bearings 69 which are pivotally mounted upon right and left hand rocker support members 70 and 71 secured at 72 to the tractor. Lifting rods 73 are extended between the rocker arms 64 and 65 and the lifting arms 62 and 63, and are pivotally connected at their ends, at 74 and 75, to the members 67 and upper ends of said lifting arms, respectively. Lifting chains 76 are connected at 77 to the rear ends of the lifting members 66 of each rocker arm and depending therefrom are connected at 78 to the plow beams 20 and 21 forwardly of the plow bottoms 22 and 23 thereon.

The forward swinging movement of the lifting arms 62 and 63, by the jacks 54 and 55 as described, will thus evidently oscillate the rocker arms 64 and 65 on their pivotal mountings by virtue of the force transmitted through the lifting rods 73 and the pull thus exerted upon the chains 76 will lift the plow units bodily from the ground. In this operation the plow beams of course pivot about their forward connections with the hitch pin 28.

Guide members 79 are secured transversely at the rear of the tractor and have laterally disposed, inverted, substantially V-shaped portions 80 at each side. Brace bars 81 are extended from said portions 80 outwardly and upwardly and secured beneath the bolts 72 mounting the rocker arm supports. The members 79 are secured to and carried by a rearward extension 83 of the hitch plate 25.

Figure 2:
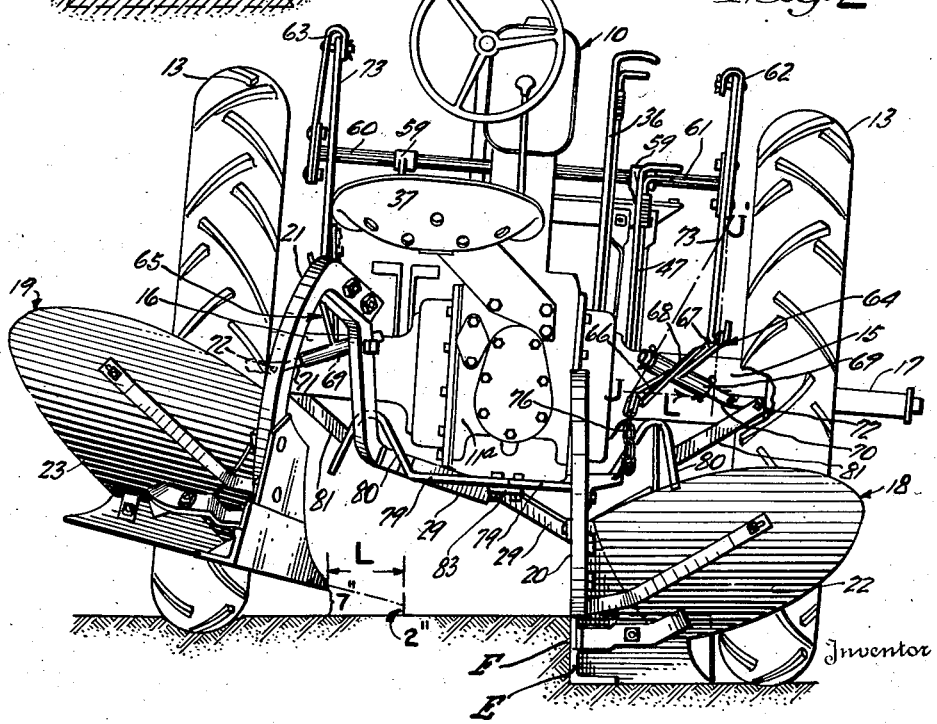
Fig. 2 is a rear end view of the structure shown in Fig. 1, the right hand plow unit being shown in working position and he left hand plow unit in idle or transport position.
Figure 4:
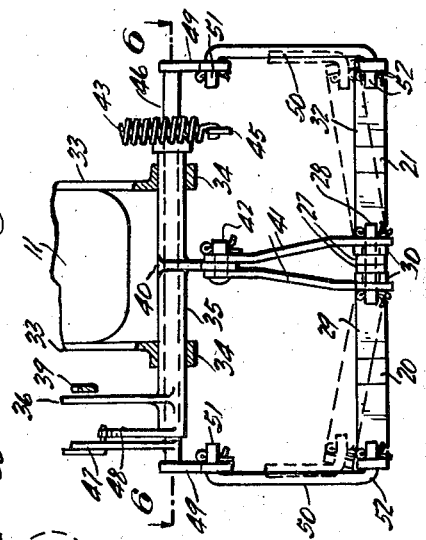
Fig. 4 is a frontal elevation of the hitch mechanism, forward ends of the beams, and associated adjustment mechanism therefor, certain bearing supports being shown in section. This view is taken substantially along the line 4—4 in Fig. 1.

An important feature of my invention resides in the novel mounting and operation of the rocker arms 64 and 65 which operate, not in a vertical plane, but angularly or on a bias. For this purpose the rocker arm support members 70 and 71 incline upwardly and inwardly, with respect to the horizontal, disposing the axes about which the rocker arms operate in corresponding angular relationship. As a result the movement of the lifting members 66 of the rocker arms is substantially along angular lines, one of which is indicated by the line J—J' in Fig. 2, and the effective supporting points (77) for the plow beams move outwardly in the lifting movement a distance controlled by this bias or angularity, as designated by L in Fig. 2. In the return or lowering motion the reverse holds true, as will be understood.

In the operation of the plow the aforesaid angular lift moves the idle plow unit (19 in Fig. 2) outwardly and upwardly to a position well behind the adjacent tractor wheel as clearly shown. Inasmuch as the other tractor wheel runs in the previously formed furrow the tractor tilts downwardly and transversely away from the land and the idle plow unit is thus swung toward the higher side of the tractor. The maximum lift is thus obtained from a given range of movement of the lifting mechanism as is expressed diagrammatically in Fig. 2, wherein L equals the lateral or outward displacement of the plow unit as it is raised. A straight up and down movement would afford, for example, only a two inch clearance from the ground, whereas the outward angular movement toward the high side of the implement affords an ample seven inches of clearance. This high lift is of advantage in the prevention of trash collection on the idle tool, as should be apparent.

Another important advantage in the angular, biased lift lies in the fact that the plow beams 20 and 21 as they move outwardly will thus clear the large, centrally located transmission housing 11a present on most tractors. Thus the beams as they rise move outward to clear this housing and are given ample clearance for movement upwardly beneath the relatively small axle housings 15 and 16. The beams may therefore be arranged to stand nearer the center longitudinal line of the tractor when in working positions, giving improved draft lines without requiring the provision of abrupt or deep bends in the beams to clear the housing.

In their lowered working positions the beams of course may swing horizontally as required by steering operations or the like. Coulters (not shown) may be used for the usual purpose ahead of the plows and may be conveniently mounted upon the beams.

Figure 3:
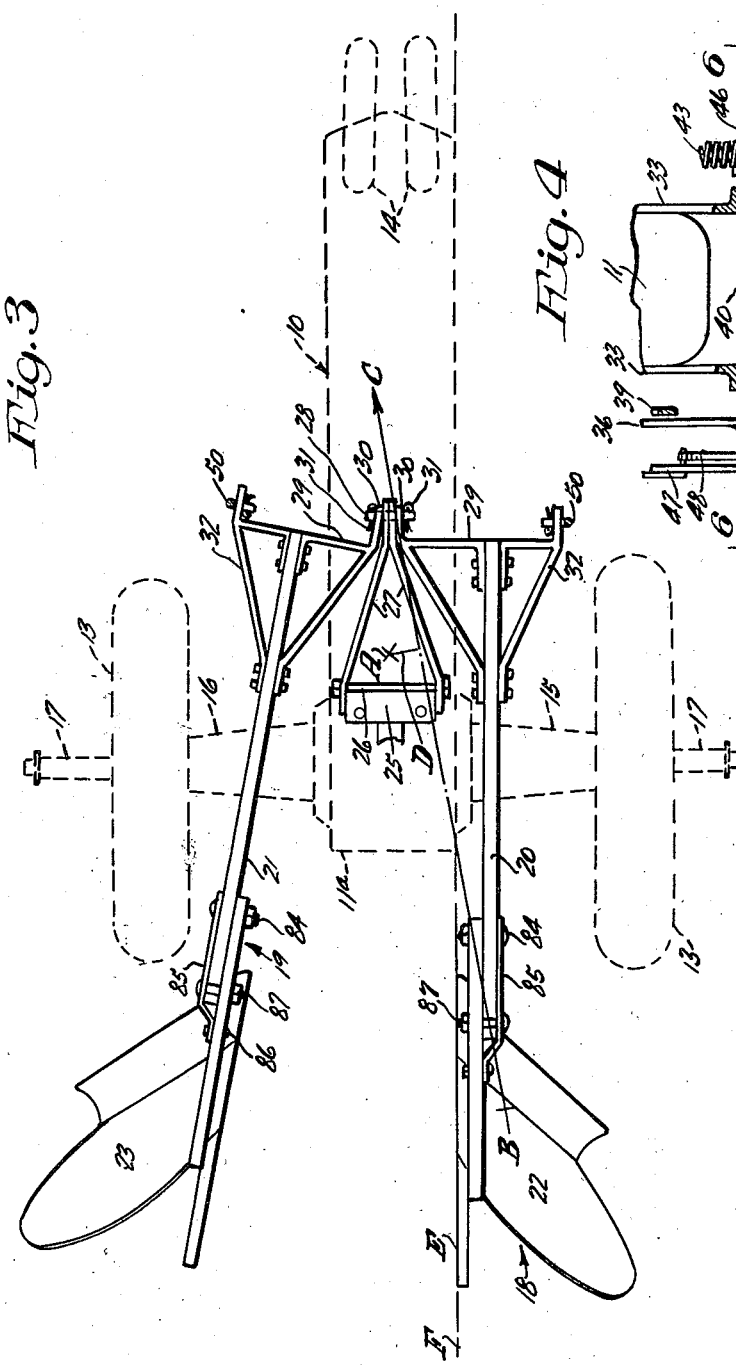
Fig. 3 is a somewhat diagrammatical plan view of the plow units, beams, and hitch connections, with the tractor outline shown in dotted lines.
Figures 5, 6:
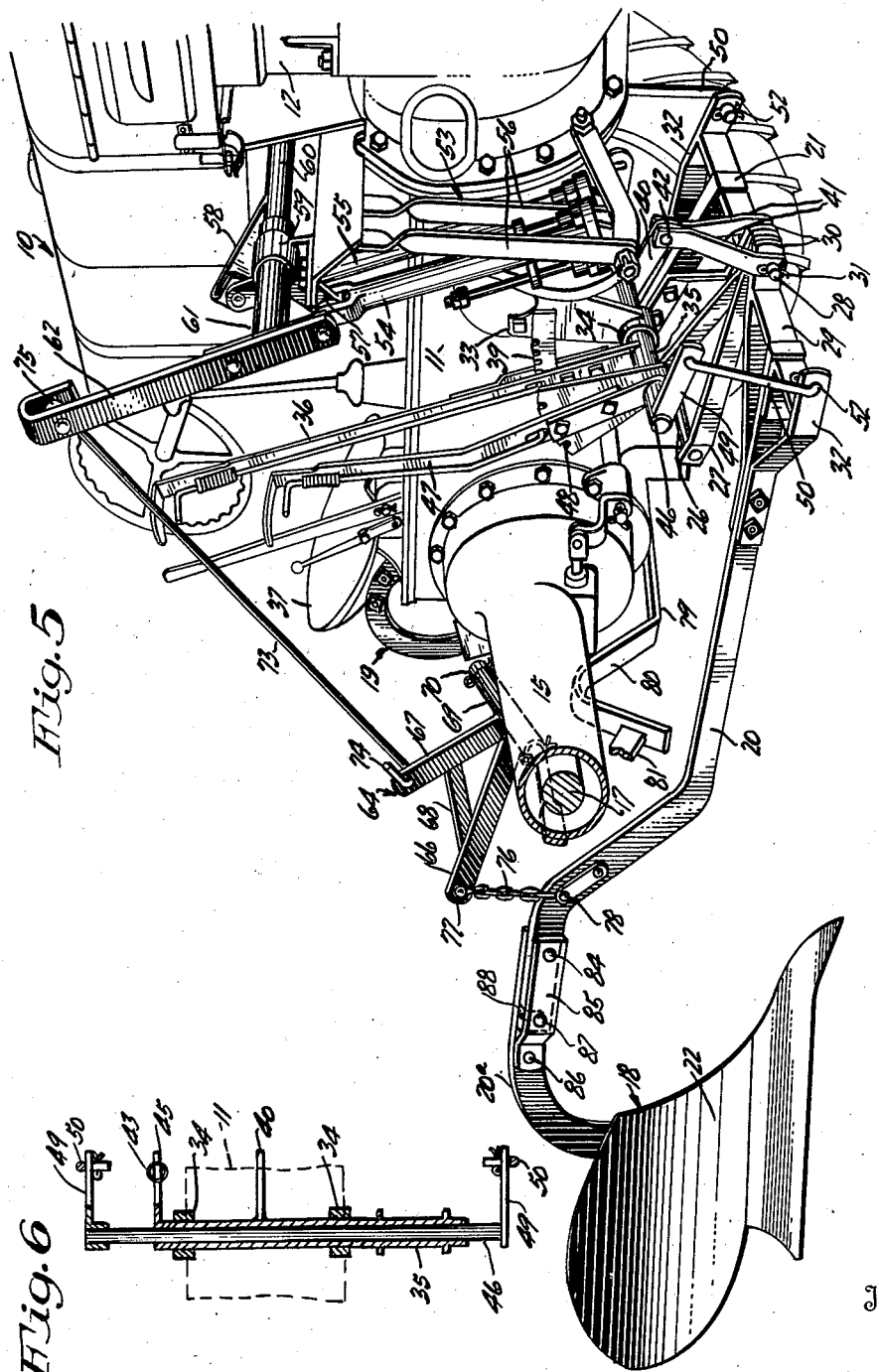
Fig. 5 is a perspective view, looking rearwardly and inwardly upon the plow and tractor, the traction wheel of the tractor being here again removed.
Fig. 6 is a horizontal transverse section along the line 6—6 in Fig. 4.

The plow units are pulled from a point (the hitch pin 28) ahead of the approximate center of draft or pull of the tractor, indicated at A in Fig. 3, the draft line of the working unit being shown as B to C. This line B—C although not passing directly through the theoretical point A, nevertheless is but a short distance, D, away and as a result the side draft is placed on the rear slip heel E of the working plow unit as it moves along the furrow wall F and removed from the tractor so that the tractor will steer without difficulty. It has hitherto been the practice to pull the beams from outwardly spaced hitch points, roughly corresponding to the points at which my leveling links 50 are connected, resulting in a large distance D and a tremendous side draft upon the tractor, as will be understood.

As the plow units are raised the beams 20—21 thereof move upwardly into the portions 80 of the guide members 79 and are thus guided in their outward movement as well as restrained against lateral swinging when in transport position.

The required leveling of the plow bottom due to the transverse tilt of the tractor as it runs with one wheel in the furrow may be readily obtained by manipulation of tilting lever 37 while depth adjustments may be made by lever 36 as has been described. The width of the furrow slice is controlled in accordance with usual practice by adjusting the traction wheels 13 upon the axles 17.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. An agricultural implement comprising a wheeled frame, a tool carrying member connected to the frame for up and down and horizontal movements with respect thereto, rocker means and a flexible element connected to the member for raising and lowering the same, and the said rocker means being movable about an axis angularly disposed to the horizontal to thereby shift the member from a straight up and down path as it is raised and lowered.

2. An agricultural implement comprising the combination with a tractor, of a tool member connected to the tractor for up and down and horizontally swinging movements, oscillatable lifting means on the tractor having a depending flexible element connected to the tool member for raising and lowering the same, and the said lifting means being supported for movement about an inclined axis for shifting the tool member laterally as it is raised and lowered.

3. An agricultural implement comprising the combination with a wheeled frame, of two tool carrying beams connected to the frame for up and down and transverse shifting movements at their rear ends, rocker members supported on the frame over each beam and connected to the beams for raising and lowering the same, means extending angularly with respect to a horizontal transverse plane and forming pivot axes for the rocker members to thereby cause the beams to be shifted angularly and transversely as they are raised and lowered, and guide means for engaging the beams as they are raised and limiting transverse shifting movements thereof while in raised position.

4. A two way plow comprising two oppositely acting plow units movable alternately into lowered operative positions, and lifting means supported for movement about axes angularly disposed with respect to the horizontal, the said lifting means being flexibly connected to rear portions of the plow units for raising and lowering the same and shifting the units outward with respect to their operative positions as they are raised.

5. A two way plow comprising the combination with a tractor, of two plow beams connected to the tractor at forward ends for movement alternately into operative positions at their rear ends at opposite sides of a normal center line of draft, a lifting member connected to each beam, support members on the tractor pivotally supporting the said lifting members and each inclined inwardly and upwardly with respect to a transverse horizontal plane, and means for oscillating said lifting members for raising and lowering the beams in angular directions.

6. An agricultural implement comprising the combination with a tractor, of two beams connected to the tractor for movement in generally up and down directions at rear ends, the said beams in their normal operative positions being disposed at opposite sides of a central line of draft and inwardly of the planes of the traction wheels of the tractor, and lifting means for each beam comprising a lever and a suspension member, the said lever being angularly axised to swing the suspension members and beams, as they are raised, outwardly.

7. An agricultural implement comprising the combination with a tractor having a centrally located rear transmission housing, of two tool beams connected to the tractor forwardly of the housing for up and down movement at rear ends, the said beams in operative positions extending rearwardly beneath said housing, and means including angularly axised levers and dependent connections with the beams for lifting the beams from operative positions and simultaneously shifting the rear ends outwardly to clear the sides of the transmission housing.

8. An agricultural implement comprising the combination with a tractor, of two tool beams extended in their operative positions in substantially parallel relation at opposite sides of a center line of draft, hitch bars pivotally mounted at one end on the tractor and extending forwardly between the tool beams, bracket members extended inwardly from forward end portions of the beams and pivotally connected to forward ends of the hitch bars, and hand lever actuated means for swinging the forward ends of said hitch bars in a vertical plane and raising and lowering forward ends of the beams.

9. An agricultural implement comprising the combination with a tractor, of two tool beams extended normally in substantially parallel positions at opposite sides of the center line of draft of the tractor, a hitch member adjustably supported on the tractor for up and down movement, the said beams being connected to the hitch member and having freedom for up and down movements and twisting movement about their longitudinal axes, bracket members on outer sides of the beams, means for raising and lowering the hitch member simultaneously with the bracket members, and means connected to the said bracket members for adjusting both beams simultaneously but in opposite directions about their longitudinal axes and independently of vertical adjustments of the hitch member.

10. An agricultural implement including a wheeled frame and comprising two oppositely acting, longitudinally disposed gangs movable alternately into working positions, each gang comprising a tool and a beam extending longitudinally therefrom, a hitch member connected to the frame and the extended ends of the beams, a pair of telescoped shafts journaled in the frame crosswise with respect to the beams, separate hand levers connected to the shafts for independently adjusting the same about their axes, means connecting one shaft to said hitch member for raising and lowering the same, and means connecting the other shaft to both beams and operative to rock the beams simultaneously in transverse vertical planes.

11. An agricultural implement including a wheeled frame and comprising two oppositely acting, longitudinally disposed gangs movable alternately into working positions, each gang comprising a tool and a beam extending longitudinally therefrom, a hitch member connected to the frame and the extended ends of the beams, a pair of telescoped shafts journaled in the frame crosswise with respect to the beams separate hand levers connected to the shafts for independently adjusting the same about their axes, means connecting one shaft to said hitch member for raising and lowering the same, means connecting the other shaft to both beams and operative to rock the beams simultaneously and in opposite directions in a transverse vertical plane, and means for selectively connecting the hand lever on said other shaft to the shaft connected to the hitch member whereby both shafts may be adjusted as a unit.

12. In combination with a tractor, a tool beam secured at its forward end to the tractor at a point in advance of the rear end thereof and extending rearwardly thereof to support a ground engaging tool, a bell-crank lever mounted upon the rear end of the tractor for oscillating movement about an axis disposed at an inclined angle, a lift connection between one arm of the bell-crank lever and the beam, and power means connected to the other arm of the lever to actuate the same.

13. In combination with a tractor, a pair of plow beams extending forwardly under the tractor and for carrying right and left hand plows at their respective rear ends, a longitudinally extending draft link pivoted at one end to the tractor and at its other end to the front ends of the beams to impart draft force from the tractor to the beams, said other end of the draft link being vertically adjustable with the beams, means for raising and lowering the front ends of the beams together with the attached end of said draft link, and means, operative independently of said last mentioned means, for simultaneously adjusting the beams in opposite directions about their longitudinal axes.

WILLIAM E. KNAPP.